(12) United States Patent
Ishida et al.

(10) Patent No.: US 8,826,883 B2
(45) Date of Patent: Sep. 9, 2014

(54) GAS ENGINE

(75) Inventors: Michiyasu Ishida, Yokohama (JP);
Kimihiko Maehata, Yokohama (JP)

(73) Assignee: Mitsubishi Heavy Industries, Ltd.,
Tokyo (JP)

( * ) Notice: Subject to any disclaimer, the term of this patent is extended or adjusted under 35 U.S.C. 154(b) by 582 days.

(21) Appl. No.: 13/128,339

(22) PCT Filed: Dec. 25, 2009

(86) PCT No.: PCT/JP2009/071695
§ 371 (c)(1),
(2), (4) Date: May 9, 2011

(87) PCT Pub. No.: WO2010/074273
PCT Pub. Date: Jul. 1, 2010

(65) Prior Publication Data
US 2011/0214639 A1 Sep. 8, 2011

(30) Foreign Application Priority Data
Dec. 26, 2008 (JP) ................................. 2008-335300

(51) Int. Cl.
*F02B 19/14* (2006.01)
*F02P 13/00* (2006.01)
(Continued)

(52) U.S. Cl.
CPC ............. *F02B 19/108* (2013.01); *Y02T 10/125* (2013.01); *F02P 13/00* (2013.01); *F02M 21/0233* (2013.01); *F02M 21/0254* (2013.01); *F02M 21/0275* (2013.01); *F02M 21/0269* (2013.01); *F01P 3/16* (2013.01); *F02B 19/12* (2013.01); *F02F 1/243* (2013.01); *Y02T 10/32* (2013.01); *F02M 21/0242* (2013.01); *F02B 19/1009* (2013.01)
USPC ............................ 123/275; 123/273; 123/261

(58) Field of Classification Search
USPC ........................... 123/253, 261, 273, 274, 275
See application file for complete search history.

(56) References Cited

U.S. PATENT DOCUMENTS 1,181,122 A * 5/1916 Eastman ................... 123/143 B
3,102,521 A * 9/1963 Slemmons .................... 123/263
(Continued)

FOREIGN PATENT DOCUMENTS

JP   S63-109275   5/1988
JP   H08-240152   9/1996
(Continued)

OTHER PUBLICATIONS

Japan Patent Office, "Decision to Grant a Patent for JP 2010-544189", Jan. 15, 2013.
(Continued)

*Primary Examiner* — Erick Solis
*Assistant Examiner* — Anthony L Bacon
(74) *Attorney, Agent, or Firm* — Manabu Kanesaka; Kenneth M. Berner; Benjamin J. Hauptman (57) ABSTRACT

Provided is a gas engine having a spark plug provided with a pre-combustion chamber and a check valve, the gas engine, in which the check valve is arranged in the neighborhood of the pre-combustion chamber, being capable of preventing adhesion of a solenoid controlled valve provided at an upstream side of the check valve due to soot accumulation, and dead volume in a fuel inlet passage. In a gas engine in which fuel gas is supplied to the pre-combustion chamber through the fuel gas inlet passage and the fuel gas supplied in the pre-combustion chamber is ignited by spark discharge at the spark plug that is fitted to a mounting hardware piece via a seat surface, a solenoid valve for performing open-close control of the fuel gas is provided, and a first check valve is also provided posterior to a discharge side of the solenoid valve so as to prevent back flow of the combustion gas from the pre-combustion chamber to the solenoid controlled valve.

6 Claims, 4 Drawing Sheets

(51) Int. Cl.
    *F02M 21/02*     (2006.01)
    *F02B 19/10*     (2006.01)
    *F01P 3/16*     (2006.01)
    *F02B 19/12*     (2006.01)
    *F02F 1/24*     (2006.01)

(56) References Cited

U.S. PATENT DOCUMENTS

| | | | | |
|---|---|---|---|---|
| 3,824,965 | A | * | 7/1974 | Clawson ........................ 123/275 |
| 4,006,725 | A | * | 2/1977 | Baczek et al. ................. 123/267 |
| 4,058,091 | A | * | 11/1977 | Tanahashi ..................... 123/261 |
| 4,091,772 | A | * | 5/1978 | Heater et al. .................. 123/575 |
| 4,248,189 | A | * | 2/1981 | Barber et al. ........... 123/169 PA |
| 4,524,744 | A | * | 6/1985 | Adams .......................... 123/459 |
| 4,892,070 | A | * | 1/1990 | Kuhnert ........................ 123/274 |
| 5,081,969 | A | * | 1/1992 | Long, III ...................... 123/274 |
| 5,222,993 | A | * | 6/1993 | Crane ........................... 123/256 |
| 5,555,868 | A | * | 9/1996 | Neumann ..................... 123/275 |
| 6,513,483 | B2 | * | 2/2003 | Riggs ........................... 123/254 |
| 6,557,519 | B1 | * | 5/2003 | Galbraith ...................... 123/256 |
| 2011/0146618 | A1 | * | 6/2011 | Lapointe et al. .............. 123/266 |

FOREIGN PATENT DOCUMENTS

| | | |
|---|---|---|
| JP | 2000-008960 | 1/2000 |
| JP | 2003-120350 | 4/2003 |
| JP | 2005-273492 | 10/2005 |
| JP | 2007-270782 A | 10/2007 |
| JP | 2009-221937 | 10/2009 |

OTHER PUBLICATIONS

WIPO, International Preliminary Report on Patentability, Aug. 16, 2011.

* cited by examiner

GAS ENGINE

RELATED APPLICATIONS

The present application is National Phase of International Application No. PCT/JP2009/071695 filed Dec. 25, 2009, and claims priority from, Japanese Application No. 2008-335300, filed Dec. 26, 2008, the disclosure of which is hereby incorporated by reference herein in its entirety.

BACKGROUND OF THE INVENTION

1. Field of the Invention

The present invention is applied to a gas engine provided with a spark plug; thereby, fuel gas is supplied to a pre-combustion chamber through a fuel gas inlet passage and the fuel gas supplied in the pre-combustion chamber is ignited by the spark discharge at the spark plug that is fitted on a seat surface in a mounting hardware piece for housing the spark plug.

2. Background of the Invention

Figure 4:
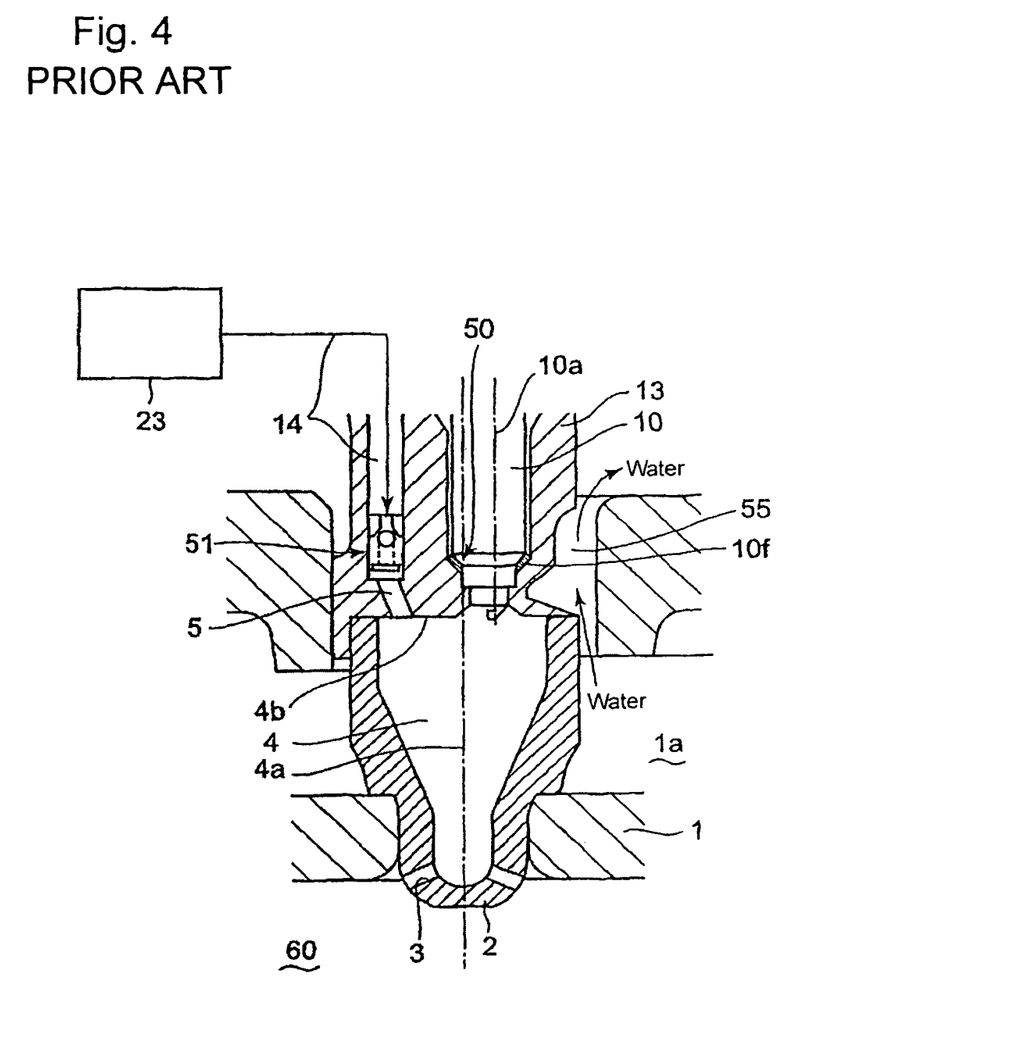
FIG. 4 explains a conventional technology in response to FIG. 1.

FIG. 4 shows a cross-section around a pre-combustion chamber 4 of a conventional gas engine provided with a spark plug, the cross-section including the vertical center axis of the pre-combustion chamber.

In FIG. 4, a pre-combustion chamber mouthpiece 2 is fastened to and on the bottom wall of a cylinder head 1, the pre-combustion chamber mouthpiece being surrounded by a water chamber 1a; and, a pre-combustion chamber 4 is formed inside the pre-combustion chamber mouthpiece.

A mounting hardware piece 13 for housing the spark plug 13 thrusts the pre-combustion chamber mouthpiece 2 toward the bottom wall of the cylinder head 1; thus, the pre-combustion chamber mouthpiece 2 is fixed in the cylinder head.

The spark plug 10 (which vertical center axis is shown with the line 10a in FIG. 4) is fitted on the mounting hardware piece 13 via a fitting seat surface 50 and a gasket 10f; the spark plug being thrust toward the fitting seat surface 50 and the gasket 10f.

Into the pre-combustion chamber, a fuel gas (for the pre-combustion in the pre-combustion chamber) is supplied through a solenoid controlled valve 23 for controlling the fuel gas supply, for example, by opening and closing the fuel gas passage in the solenoid valve, as well as through a fuel inlet passage 14; on a part way of the fuel inlet passage 14, a check valve 51 is provided, the valve 51 being a unidirectional valve which automatically opens with forward flow and closes against reverse flow. While the check valve is being opened, the fuel gas streams into the pre-combustion chamber 4 (which vertical center axis is shown with the line 4a in FIG. 4) through a fuel gas inlet slot 5; the fuel gas having streamed into the chamber 4 is ignited by the spark discharge at the spark plug; thus, flames and combustion gas is generated in the pre-combustion chamber 4.

Further, the flames and combustion gas generated in the pre-combustion chamber 4 gush into the main combustion chamber 60 through at least one torch jet nozzle 3 provided at the lower part of the pre-combustion chamber mouthpiece; the flames and combustion gas gushing into the main combustion chamber 60 ignite the lean, prefixed air-fuel mixture that is induced into the main chamber 60 through the intake air passages (not shown); and, the lean, premixed air-fuel mixture burns in the main chamber 60.

In the fuel inlet passage of the conventional gas engine provided with the spark plug 10 as described above, the check valve 51 that streams only forward flow; the pressures of high temperature conditions in the pre-combustion chamber 4 work on the check valve 51, from below upward; on the other hand, the fuel gas supplied in the pre-combustion chamber 4 is often difficult, to burn completely; the imperfect combustion causes soot, and the soot generated in the pre-combustion chamber 4 tends to be collected around the check valve 51 or the seat of the valve. The soot deposit often causes the adhesion of the check valve toward the fitting component thereof or the adhesion of the seat thereof; and, the soot deposit often causes the poor condition of the seat surface between the check valve and the bearing component thereof.

The patent reference 1 (JP2000-8960) discloses a pre-combustion chamber fuel gas supply device in which fuel gas is supplied to the pre-combustion chamber from a fuel gas reforming apparatus (that is provided with a solenoid valve at the gas discharge side of the apparatus), through a check valve that is arranged just above the pre-combustion chamber, the check valve being a unidirectional valve which automatically opens with forward flow and closes against reverse flow.

The patent reference 2 (JP1996-240152) discloses a pre-combustion chamber fuel gas supply device in which a bail valve type check valve and a needle valve type check valve are arranged in series in the fuel inlet type so that the carbon adhesion of the check valves is prevented, the adhesion being caused by excessively high temperatures.

In a case of a gas engine provided with a spark plug 10 as shown in FIG. 4, the check valve 51 is arranged just above the pre-combustion chamber 4; thus, as described above, the pressures of high temperature conditions in the pre-combustion chamber 4 work on the check valve 51, from below upward; the fuel gas supplied in the pre-combustion chamber 4 is often difficult to burn completely; the imperfect combustion causes soot, and the soot generated in the pre-combustion chamber 4 tends to be collected around the check valve 51 or the seat of the valve. The soot deposit often causes the adhesion of the check valve toward the fitting component thereof or the adhesion of the seat thereof; further, the soot tends to cause the adhesion of the solenoid valve or the deterioration of the poor seat conditions as to the check valve and the solenoid valve. Hence, it becomes necessary to restrain the temperature rise of the check valve 51 and the neighborhood thereof.

The fuel gas is supplied to the check valve 51 through the solenoid valve 23 for controlling the fuel gas supply and the fuel inlet passage 14; as described above, in a case where a difficulty of the check valve 51 is caused, for example, by the soot generation, it becomes also difficult to prevent the solenoid valve 23 from causing a malfunction, as is pointed out in the patent reference 1 (JP2000-8960).

Further, it is required to pay attention to the loss due to the dead volume in the fuel inlet passage; hereby, the dead volume means unnecessary space to supply the fuel gas of the prescribed fuel flow rate, into the pre-combustion chamber.

However, the patent reference 2 (JP1996-240152) only discloses the approach by which a bail valve type check valve and a needle valve type check valve are arranged in series in the fuel inlet type.

REFERENCES

Patent References

Patent Reference 1: JP2000-8960
Patent Reference 2: JP1996-240152

SUMMARY OF THE INVENTION

In view of the subjects in the conventional technologies as described above, the present invention aims at disclosing a gas engine provided with a spark plug; thereby, in a case where the check valve is arranged in the neighborhood of the pre-combustion chamber, the solenoid valve provided at the upstream side of the check valve can be prevented from causing the adhesion due to the soot accumulation; further, the loss due to the dead volume in the fuel inlet passage can be dispensed with.

In order to settle the subjects as described above, the present invention discloses a spark ignition gas engine provided with a spark plug, the gas engine comprising a fuel inlet connecting piece connected to a mounting hardware piece provided in a cylinder head for housing the spark plug, thereby supplying fuel gas from the fuel inlet connecting piece to a pre-combustion chamber through a fuel passage provided in the mounting hardware piece, the fuel gas supplied in the pre-combustion chamber being ignited by spark discharge at the spark plug that is fitted on a fitting seat surface in the mounting hardware piece; wherein the gas engine further comprises: a solenoid valve that performs open-close control of the fuel gas which streams into a fuel inlet passage bored in the fuel inlet connecting piece; and a first check valve that is provided posterior to a discharge side of the solenoid valve in the fuel inlet passage, so that the combustion gas generated in the pre-combustion chamber is prevented from flowing backwards in a direction from the pre-combustion chamber toward the solenoid valve.

A preferable embodiment of the present invention is the spark ignition gas engine, comprising: a second check valve arranged at a location just above the pre-combustion chamber in the fuel passage in the mounting hardware piece, thereby preventing the combustion gas generated in the pre-combustion chamber from flowing backwards, from the pre-combustion chamber toward the fuel inlet passage; and the first check valve arranged on the fuel inlet passage in the fuel inlet connecting piece.

An other preferable embodiment of the present invention is the spark ignition gas engine, wherein the second check valve and the spark plug are arranged in the mounting hardware, so that a center axis of the second check valve is parallel to a center axis of the spark plug; a plurality of cooling grooves or bore-cooling holes is provided in the mounting hardware piece; and a tip part of the fuel inlet connecting piece is inserted in a circumferential wall surface of the mounting hardware piece, so that the cooling grooves or bore-cooling holes face an outlet end of the fuel inlet connecting piece.

An other preferable embodiment of the present invention is the spark ignition gas engine, the first check valve comprising: an upstream side fuel gas passage connected to the solenoid valve; a plurality of passage holes communicating with the upstream side fuel gas passage; a gas volume to which an end part of each passage hole opens; and a valve that opens and closes the communication between the gas volume and the fuel inlet passage on the downstream side of the first check valve by opening and closing the gas volume by the aid of a spring force.

An other preferable embodiment of the present invention is the spark ignition gas engine, wherein each of the first check valve and the second check valve comprises the valve that is controlled, to open and close by the aid of a spring force.

According to the present invention, in the gas engine, the fuel gas having passed, through the fuel inlet passage is supplied to the pre-combustion chamber; the fuel gas supplied in the pre-combustion chamber is ignited by the spark discharge at the spark plug that is fitted on a seat surface in the mounting hardware piece; and, the gas engine is provided with, a solenoid valve that performs open-close control of the fuel gas flow which streams into the fuel inlet passage and a first check valve that is provided just after the fuel gas discharge side of the solenoid valve in the fuel inlet passage, so that the combustion gas generated in the pre-combustion chamber is prevented from flowing backwards, from the pre-combustion chamber toward the solenoid valve.

Hence, by providing the first check valve for preventing the fuel gas from back-flowing just after the fuel gas discharge side of the solenoid valve, the soot caused partly by the imperfect combustion in the pre-combustion chamber on the downstream side of the fuel gas flow can be prevented from entering the first check valve as well as the solenoid valve. Thus, the solenoid valve can be completely protected from the soot or the malfunction attributable to the soot.

Further, in a preferable embodiment of the present invention, the first check valve is arranged at a location not only just after the fuel gas discharge side of the solenoid valve in the fuel inlet passage, bat also on a part way of the fuel inlet passage; and, the second check valve that is provided in the fuel passage in the mounting hardware piece, just above the pre-combustion chamber, so that the combustion gas generated in the pre-combustion chamber is prevented from flowing backwards, from the pre-combustion chamber toward the fuel inlet passage.

Hence, at first, the soot caused by the combustion in the pre-combustion chamber is prevented from entering the fuel inlet passage through the second check valve, the pre-combustion chamber being exposed to the high temperature combustion gas; secondly, the potential back-flow and the soot accompanied by the potential back-flow is prevented from entering the solenoid valve through the first check valve that is provided just after the fuel gas discharge side of the solenoid valve, the low temperature gas of a certain level of pressure in the fuel inlet passage working on the first check valve; thus, the solenoid valve is doubly protected from the soot. In this way, the first check valve and the second check valve perfectly protect the solenoid valve from, the entry of the soot; and, the protection effect regarding the solenoid valve surely enhanced.

Further, in another preferable embodiment of the present invention, the fuel inlet connecting piece is arranged so that the tip part of the fuel inlet connecting piece is inserted inside of the circumferential wall surface of the mounting hardware piece for housing the spark plug; accordingly, the distance between the first check valve and the second check valve can be arranged in a short distance; thus, the capacity regarding the dead volume can be adjustably controlled; further, the optimal capacity regarding the dead volume can be easily established, so that the fluctuation of the fuel gas pressures is taken into consideration; hereby, the dead volume means unnecessary space to supply the fuel gas of the prescribed fuel flow rate, into the pre-combustion chamber.

Further, in another preferable embodiment of the present invention, the second check valve and the spark plug are arranged in the mounting hardware piece for housing the spark plug, so that the center axis of the check valve insert hole for the second check valve is parallel with the center axis of the spark plug; a plurality of cooling grooves or bore-cooling holes is provided in the mounting hardware piece for housing the spark plug and the second check valve, cooling water streaming or circulating along the cooling grooves or the bore-cooling holes so as to cool the mounting hardware piece; the fuel inlet connecting piece in which the first check valve is provided is fastened to the mounting hardware piece; the tip part of the fuel inlet connecting piece is inserted inside of the circumferential wall surface of the mounting hardware piece; the tip part is placed in the neighborhood of the multiple cooling grooves or the multiple bore-cooling holes, the cooling grooves or the bore-cooling holes being arranged along the hoop direction around the spark plug; the area around the tip part in the mounting hardware piece is arranged so as to be closer to the cooling grooves or the bore-cooling holes.

Thus, the fuel inlet-connecting piece can be cooled, and the temperature rise of the first check valve provided in the fuel inlet-connecting piece can be restrained. In addition, as described above, the tip part of the fuel inlet connecting piece is inserted inside of the circumferential wall surface of the mounting hardware piece for housing the spark plug; thus, the capacity regarding the dead volume can be adjustably controlled; further, the optimal capacity regarding the dead volume can be easily established, so that the fluctuation of the fuel gas pressures is taken into consideration.

In another preferable embodiment of the present invention, the first check valve comprises: a gas passage on the upstream side in the first check valve, the gas passage being connected to the solenoid valve; a plurality of passage holes communicating with the gas passage on the upstream side in the first check valve and a gas volume at end openings of the passage holes; a valve that opens and closes the communication between the gas volume and the fuel inlet passage on the downstream side of the first check valve, by the aid of the spring force which is derived from a valve spring installed in the first check valve.

In addition, in another preferable embodiment, of the present invention, the configuration of the second check valve is basically the same as that of the first check valve, namely, if the configuration regarding the spring force characteristics and the gas force characteristics in the first check valve is the same as the configuration regarding the spring force characteristics and the gas force characteristics in the second check valve, then the first check valve and the second check valve can be manufactured with a common configuration; thus, the manufacturing cost for providing the first and second check valves can be reduced.

BRIEF DESCRIPTION OF THE DRAWINGS

The present invention will now be described in greater detail with reference to the preferred embodiments of the invention and the accompanying drawings, wherein.

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Figure 1:
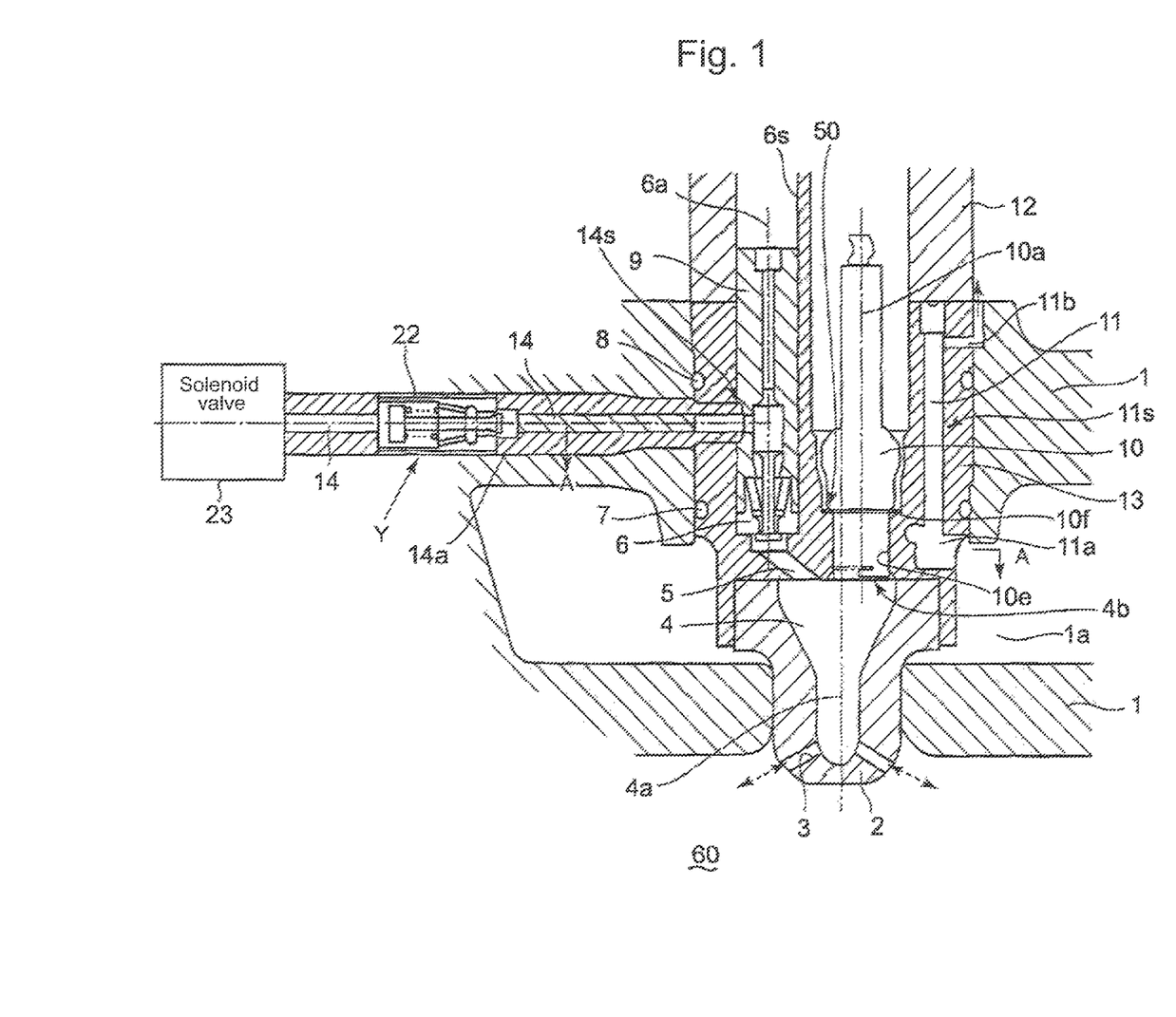
FIG. 1 shows a cross-section of a gas engine provided with a spark plug, according to an embodiment of the present invention, the cross-section including the vertical center axis of a pre-combustion chamber provided in the gas engine.
Figure 2:
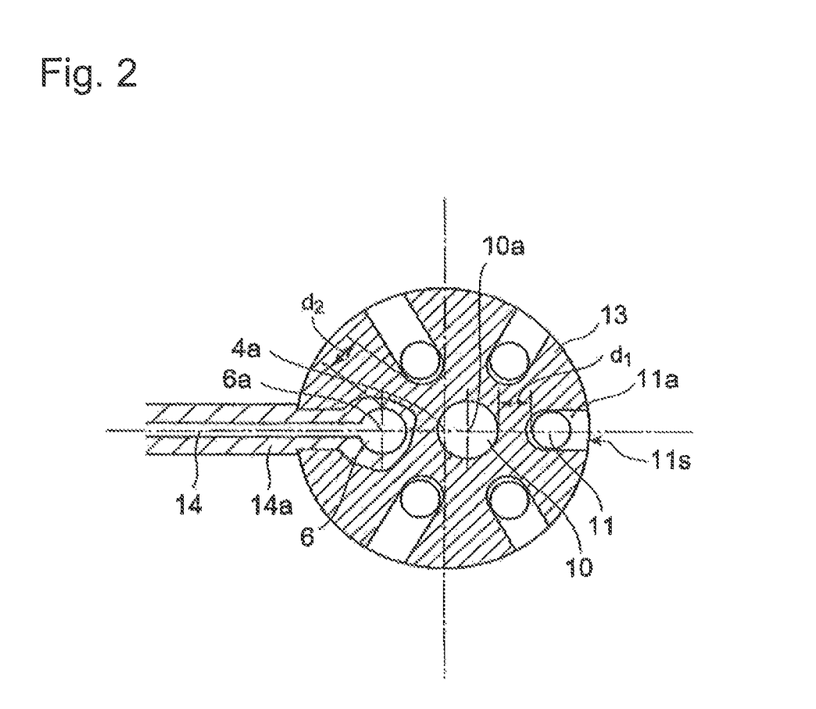
FIG. 2 shows A-A cross-section of FIG. 1.

FIG. 1 shows a cross-section of a gas engine provided with a spark plug, according to an embodiment of the present invention, the cross-section including the vertical center axis of a pre-combustion chamber provided in the gas engine; FIG. 2 shows A-A cross-section of FIG. 1.

In FIG. 1, a pre-combustion chamber mouthpiece (a pre-combustion chamber mouthpiece) 2 is fastened to and on the bottom wall of a cylinder head 1, the pre-combustion chamber mouthpiece being surrounded by a water chamber 1a; and, a pre-combustion chamber 4 is formed inside the pre-combustion chamber mouthpiece. A mounting hardware piece 13 for housing the spark plug 10 thrusts the pre-combustion chamber mouthpiece 2 toward the bottom wall of the cylinder head 1; thus, the pre-combustion chamber mouthpiece 2 is fixed in the cylinder head 1.

The spark plug 10 (which vertical center axis is shown with, the line 10a in FIG. 3) is fitted on the mounting hardware piece 13 via a fitting seat surface 50 and a gasket 10f, the spark plug being thrust toward the fitting seat surface and the gasket. An o-ring 7 and an o-ring 8 are fitted into the circumference of the mounting hardware piece 13.

As the spark plug 10, a spark plug of a flat type that has an ordinary center electrode and an ordinary earth electrode is preferably used; a spark plug of what they call J-shape type may be also used.

In the circumference of the sparkplug 10, a plurality of bore-cooling holes 11s is provided; each bore-cooling hole 11s is configured with a lateral bore-cooling hole 11a (an inlet side bore-cooling hole that is arranged at the lower side of the hole 11s), a vertical bore-cooling hole 11 that is arranged along a center axis 10a of the spark plug 10, and a lateral bore-cooling hole 11b (an outlet side bore-cooling hole that is arranged at the upper side of the hole 11s); thereby, the cooling water streams from the lateral bore-cooling hole 11a to the lateral bore-cooling hole 11b, through the vertical bore-cooling hole 11; and, the multiple vertical bore-cooling holes 11 surround the high temperature part of the spark plug 10, and the cooling water streaming through the vertical bore-cooling holes intensively cools the nigh temperature part of the spark plug 10.

The configuration described above is the same as the conventional configuration described in FIG. 4. The present invention, relates to the improvement regarding the pre-combustion chamber fuel-gas supply device.

In FIG. 1, a solenoid (controlled) valve 23 for controlling the fuel gas supply is arranged at the inlet end side of a fuel inlet connecting piece 14a in which a fuel inlet passage 14 for streaming the fuel gas is arranged; from the solenoid valve 23, fuel gas is supplied to the pre-combustion chamber through the fuel inlet passage 14 that is a passage bored in the fuel inlet connecting piece 14a along the longitudinal center axis of the piece 14a.

The fuel inlet connecting piece 14a is formed as a piece different from the mounting hardware piece 13 for housing the spark plug; the fuel inlet connecting piece 14a is fastened to the mounting hardware piece 13, at a junction 14s (that is a fuel gas inlet location regarding a check valve holder of the second check valve 6), by means of a fastening method such as a screw-in method.

Further, the center axis 6a of the check valve insert hole 6s is arranged so as to be parallel with the center axis 10a of the spark plug 10; at the lower location of the check valve insert hole 6s, as well as, over and near to a top side 4b of the pre-combustion chamber 4, the second check valve 6 is placed, being housed by the check valve holder 9; naturally, the second check valve 6 automatically opens with the forward flow, namely, the fuel gas flow toward the pre-combustion chamber 4.

Further, on a part way of the fuel inlet passage 14 that is formed in the fuel inlet connecting piece 14a, a first check valve 22 is provided between the solenoid valve 23 for controlling the fuel gas supply and the gas discharge side end (on the side of the mounting hardware piece for the spark plug) of the fuel inlet connecting piece 14a, namely, the junction 14s; preferably, the first check valve 22 is arranged, just on the downstream side of the solenoid valve 23, the first valve streaming the fuel gas only along the forward direction.

More in detail, the longitudinal axis of the fuel inlet connecting piece 14a in which the fuel inlet passage 14 is formed is arranged so as to be at right angles to the center axis 6a of the check valve insert hole 6s; thereby, the center axis 6a of the check valve insert hole 6s is arranged so as to be parallel with the center axis 10a of the spark plug 10; incidentally, the second check valve 6 is arranged just above the pre-combustion chamber 4, in the check valve insert hole 6s. Thus, the first check valve 22 is placed inside the fuel inlet connecting piece 14a.

In other words, arranging the fuel inlet connecting piece 14a so as to be at right angles to the mounting hardware piece 13 for housing the spark plug 10 makes it easy to arrange the distance between the first check valve 22 and the second check valve 6; thus, the capacity regarding the dead volume can be adjustably controlled; further, the optimal capacity regarding the dead volume can be easily established, so that the fluctuation of the fuel gas pressures is taken into consideration.

Figure 3:
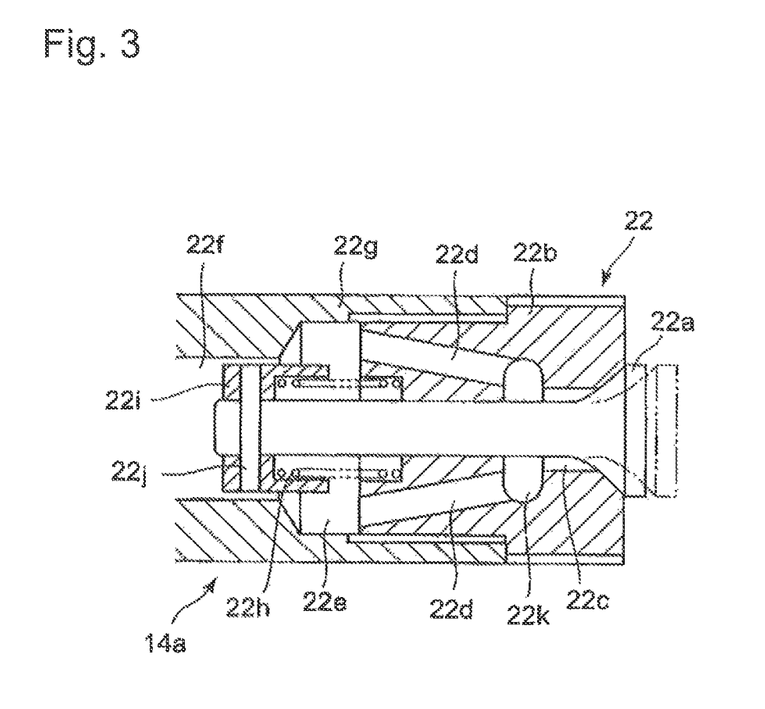
FIG. 3 shows an enlargement of the part Y in FIG. 1.

FIG. 3 shows an example cross-section regarding the first check valve.

The first check valve 22 comprises an upstream side fuel gas passage 22f connected to the solenoid valve 23, and a plurality of passage holes 22d connected to the upstream side fuel gas passage 22f; the passage holes are bored in a case 22b that is screwed into a valve body 22g.

Each passage hole 22d communicates with a gas volume 22k at an end opening of the passage hole; the gas volume 22k communicates with a gas passage 22c that is located on the downstream, side of the gas volume 22k.

In the first check valve 22 as shown in FIG. 3, a valve spring 22 is provided between the case 22b and a support member 22i that is connected to a valve 22a via a support pin 22j; a pre-compression force (an initial spring force; is given to the valve spring 22 so that the pre-compression force works on the support member 22i along the gas flow reverse direction and the valve 22a closes the gas passage 22c; when the fuel gas streams into the gas passage 22f and the fuel gas pressure, namely, a gas force works on the support member 22i along the gas flow direction; further, when the gas force exceeds the pre-compression force, then the valve 22a opens the gas passage 22c.

In this way, the fuel gas streams from the solenold valve 23 toward the second check valve 6 through the first check valve 22 and the fuel (gas) inlet passage 14.

Thus, the valve 22a can surely open and close the gas passage 22c on the downstream side of the gas volume 22k with which the multiple passage holes 22d communicate.

In addition, if the configuration of the second check valve 6 is basically the same as that of the first, check valve 22, namely, if the spring force characteristics regarding the valve spring 22h and the gas force characteristics regarding the valve 22a and the support member 22i are common in the first check valve 22 and the second check valve 6, then the first check valve 22 and the second check valve 6 can be manufactured with a common configuration; thus, the manufacturing cost for providing the first and second check valves can be reduced.

Incidentally, in the configuration example of FIG. 3, if the gas (pressure) force working on the valve 22a exceeds the spring force, then the check valve opens; on the contrary, if the gas force working on the valve 22a is smaller than the spring force, then the check valve closes. The example shows a pre-compression spring force; as a matter of course, there may be an example of a pre-tension spring force type.

On the other hand, the cooling water streaming through the bore-cooling hole cools the second check valve 6 that is heated up to a high temperature.

Thereby, the height level of the seat surface 50 on which the spark plug 10 sits is arranged between the height level of the lateral bore-cooling hole 11a (on the inlet side) and the height level of the lateral bore-cooling hole 11b (on the outlet side); the multiple vertical bore-cooling holes 11 surround the high temperature part of the spark plug 10, namely, the neighborhood of the seat surface 50; and, the cooling water streaming through the vertical bore-cooling holes intensively cools the neighborhood area and the spark plug 10.

FIG. 2 shows A-A cross section of FIG. 1; A-A cross-section includes a horizontal cross-section that includes the longitudinal center axis of the fuel inlet connecting piece 14a. In FIG. 2, the arrangement of the bore-cooling holes 11s along a hoop direction is shown in a horizontal cross section; the multiple vertical bore-cooling holes 11 surround the spark plug 10. Further, the check valve holder 9 housing the second check valve 6 is placed between two vertical bore-cooling holes 11 that are both next to the check valve holder 9.

As shown in FIG. 2, the distance d1 between the spark plug 10 and the vertical bore-cooling hole 11 is made as short as possible; the distance d2 between the check valve 6 and the vertical bore-cooling hole 11 is made as short as possible. Thus, the cooling effect by the bore-cooling configuration can be maximized.

According to the embodiment as described above, in the gas engine, fuel gas is supplied to the pre-combustion chamber 4 through the fuel gas inlet passage 14, and the fuel gas supplied in the pre-combustion chamber 4 is ignited by the spark discharge at the spark plug 10 that is fitted on the seat surface 50 in the mounting hardware piece 13 for housing the spark plug 10; thereby, the engine is provided with the solenoid valve 23 for controlling the fuel gas supply and the first check valve 22 for preventing the reverse flow of the fuel gas (or the combustion gas) from the pre-combustion chamber side, the first check valve 22 being arranged on the downstream side of the solenoid valve 23 and just after the solenoid valve 23.

In other words, by providing the first check valve 22 for preventing the fuel gas from back-flowing just after the fuel gas discharge side of the solenoid valve 23, the soot caused partly by the imperfect combustion in the pre-combustion chamber 4 on the downstream side can be prevented from entering the first check valve 22 as well as the solenoid valve 23. Hence, the solenoid valve can be completely protected from the soot or the malfunction due to the soot.

Further, according to the embodiment as described above, the second check valve 6 is provided just above the pre-combustion chamber 4 so that the second check valve 6 prevents the combustion gas generated in the pre-combustion chamber 4 from, back-flowing; further, the second check valve 6 communicates with, the first check valve 22 through the fuel inlet passage 14 bored in the fuel inlet connecting piece 14a; thus, at first, the soot caused by the combustion in the pre-combustion chamber 4 is prevented from entering the fuel inlet passage 14 through the second check valve 6, the pre-combustion chamber 4 being exposed to the high, temperature combustion gas; secondly, the potential back-flow and the soot accompanied by the potential back-flow is prevented from entering the solenoid valve 23 through the first check valve 22 that is provided just after the fuel gas discharge side of the solenoid valve 23, the low temperature gas of a certain level of pressure in the fuel inlet passage 14 working on the first check valve 22; thus, the solenoid valve 23 is doubly protected from the soot. In this way, the first check valve 22 and the second check valve 6 perfectly protect the solenoid valve 23 from the entry of the soot; and, the protection effect regarding the solenoid valve 23 surely enhanced.

Further, the fuel inlet connecting piece 14a is arranged so as to be at right angles to the mounting hardware piece 13 for housing the spark plug 10; accordingly, the distance between the first check valve 22 and the second check valve 6 can be arranged in a short distance; thus, the capacity regarding the dead volume can be adjustably controlled; further, the optimal capacity regarding the dead volume can be easily established, so that the fluctuation of the fuel gas pressures is taken into consideration.

In other words, by arranging the longitudinal length of the fuel inlet connecting piece 14a, it becomes easy to freely arrange the distance between the first check valve 22 and the second check valve 6; accordingly, the capacity regarding the dead volume can be adjustably controlled; further, the optimal capacity regarding the dead volume can be easily established, so that the fluctuation of the fuel gas pressures is taken into consideration.

On the other hand, the fuel inlet connecting piece 14a in which the first check valve 22 is provided is fastened to the mounting hardware piece 13 for housing the sparkplug 10 (at the junction 14s); thus, the fuel inlet connecting piece 14a is cooled in response to the cooling of the mounting hardware piece 13; namely, there is no apprehension about the temperature rise of the fuel inlet connecting piece 14a.

In other words, the tip part of the fuel inlet connecting piece 14a is inserted inside of the circumferential wall surface of the mounting hardware piece 13; in addition, the tip part is placed in the neighborhood of the multiple cooling grooves or the multiple bore-cooling holes, the cooling grooves or the bore-cooling holes being arranged along the hoop direction around the spark plug; the area around the tip part is arranged, so as to be closer to the cooling grooves or the bore-cooling holes; accordingly, the fuel inlet connecting piece 14a can be cooled, and the temperature rise of the first check valve 22 provided in the fuel inlet connecting piece 14a can be restrained.

Further, even when the malfunction of the second check valve 6 occurs, the first check valve 22 prevents the combustion gas from entering the solenoid valve 23 through the first check valve 22. In this way, the first check valve 22 configures a back-up device (a fail safe device) for the second check valve 6 so as to protect the solenoid valve 23 from the possible malfunctions.

Industrial Applicability

According to the present invention, a gas engine provided with a spark plug can be realized; thereby, in a case where the check valve is arranged in the neighborhood of the pre-combustion chamber, the solenoid valve provided at the upstream, side of the check valve can be prevented from causing the adhesion due to the soot accumulation; further, the loss due to the dead volume in the fuel inlet passage can be dispensed with.

The invention claimed is:

1. A spark ignition gas engine comprising:
  a spark plug fitted on a fitting seat surface;
  a mounting hardware piece having the fitting seat surface therein;
  a fuel passage provided in the mounting hardware piece;
  a pre-combustion chamber disposed under the spark plug;
  a cylinder head for housing the spark plug, the mounting hardware piece being provided in the cylinder head;
  a fuel inlet connecting piece connected to the mounting hardware piece to supply fuel gas from the fuel inlet connecting piece to the pre-combustion chamber through the fuel passage, the fuel gas supplied in the pre-combustion chamber being ignited by spark discharge at the spark plug;
  a fuel inlet passage bored in the fuel inlet connecting piece;
  a solenoid valve that is provided at an inlet end of the fuel inlet connecting piece and is configured to perform open-close control of the fuel gas which streams into the fuel inlet passage; and
  a first check valve that is provided in the fuel inlet passage at a location nearer to the solenoid valve than the pre-combustion chamber relative to the spark plug so that combustion gas generated in the pre-combustion chamber is prevented from flowing backwards in a direction from the pre-combustion chamber toward the solenoid valve.

2. The spark ignition gas engine according to claim 1, further comprising a second check valve arranged at a location just above the pre-combustion chamber in the fuel passage in the mounting hardware piece to prevent the combustion gas generated in the pre-combustion chamber from flowing backwards, from the pre-combustion chamber toward the fuel inlet passage,
  wherein the first check valve is arranged on the fuel inlet passage in the fuel inlet connecting piece.

3. The spark ignition gas engine according to claim 2,
  wherein the second check valve and the spark plug are arranged in the mounting hardware piece, so that a center axis of the second check valve is parallel to a center axis of the spark plug;
  a plurality of cooling grooves or bore-cooling holes is provided in the mounting hardware piece; and
  a tip part of the fuel inlet connecting piece is inserted in a circumferential wall surface of the mounting hardware piece, so that the cooling grooves or bore-cooling holes face an outlet end of the fuel inlet connecting piece.

4. The spark ignition gas engine according to claim 1, wherein the first check valve comprises
  an upstream side fuel gas passage connected to the solenoid valve;
  a plurality of passage holes communicating with the upstream side fuel gas passage;
  a gas volume to which an end part of each of the plurality of passage holes opens; and
  a valve that opens and closes communication between the gas volume and the fuel inlet passage on a downstream side of the first check valve by opening and closing the gas volume by an aid of a spring force.

5. The spark ignition gas engine according to claim 2, wherein each of the first check valve and the second check valve comprises a valve that is controlled to open and close by an aid of a spring force.

6. The spark ignition gas engine according to claim 2, wherein the fuel inlet connecting piece is connected to the mounting hardware piece orthogonal to a central axis of the mounting hardware piece.

* * * * *